P. G. NUERNBERGER & G. RETTIG, Jr.
TYPE CASTING MACHINE.
APPLICATION FILED DEC. 14, 1905.

913,546.

Patented Feb. 23, 1909.
7 SHEETS—SHEET 1.

Fig. 1.

Witnesses:
C. L. Gaylord,
John Enders.

Inventors:
P. G. Nuernberger.
George Rettig Jr.
By L. B. Coupland
Atty.

P. G. NUERNBERGER & G. RETTIG, Jr.
TYPE CASTING MACHINE.
APPLICATION FILED DEC. 14, 1905.

913,546.

Patented Feb. 23, 1909.
7 SHEETS—SHEET 6.

UNITED STATES PATENT OFFICE.

PHILIP G. NUERNBERGER AND GEORGE RETTIG, JR., OF CHICAGO, ILLINOIS, ASSIGNORS TO UNIVERSAL AUTOMATIC TYPECASTING MACHINE COMPANY, OF CHICAGO, ILLINOIS, A CORPORATION OF ILLINOIS.

TYPE-CASTING MACHINE.

No. 913,546.  Specification of Letters Patent.  Patented Feb. 23, 1909.

Application filed December 14, 1905. Serial No. 291,756.

*To all whom it may concern:*

Be it known that we, PHILIP G. NUERNBERGER and GEORGE RETTIG, Jr., citizens of the United States, residing at Chicago, in the county of Cook and State of Illinois, have invented new and useful Improvements in Type-Casting Machines, of which the following is a specification.

This invention relates to metal casting machines and more especially to that class of casting machines used in the production of printing type; and has for its object generally to provide mechanism that will produce castings or type having smooth finished surfaces ready for practical use when discharged from the mold and entirely dispensing with the usual after finishing process.

This machine is also more especially intended for use in connection with the improved casting molds set forth in our pending application Serial No. 256,930, to which reference may be made.

In the drawing, Fig. 9 is a section on line 9, Fig. 5. Figs. 10, 11, 12, 13 and 14 are also details of the matrix holding features. Fig. 21 is a plan of the bifurcated end of the upper mold-block. Fig. 23 is a vertical longitudinal section of the same.

The machine shown in the drawings embraces a number of parts common in this class of machines, and of which a full detailed description will be omitted.

A represents the different parts of the frame and B the table or bed of the machine. The driving shaft C for transmitting motion is located above the table and is provided with suitable bearings.

The lower end of the usual vibrating-plate 21 is mounted on a pivot-shaft 22 (Figs. 1, 2 and 16) the upper end being free to move forward for the mold to receive the charge of molten metal and then back again in discharging the cast product. This reciprocating or rocking movement of plate 21 being the ordinary operation common in this class of machines.

The casting molds and parts operatively used in connection with the same, including means for holding the matrix, will be first described.

Figures 9, 10, 11, 12A, 13, 14, 21, 23:
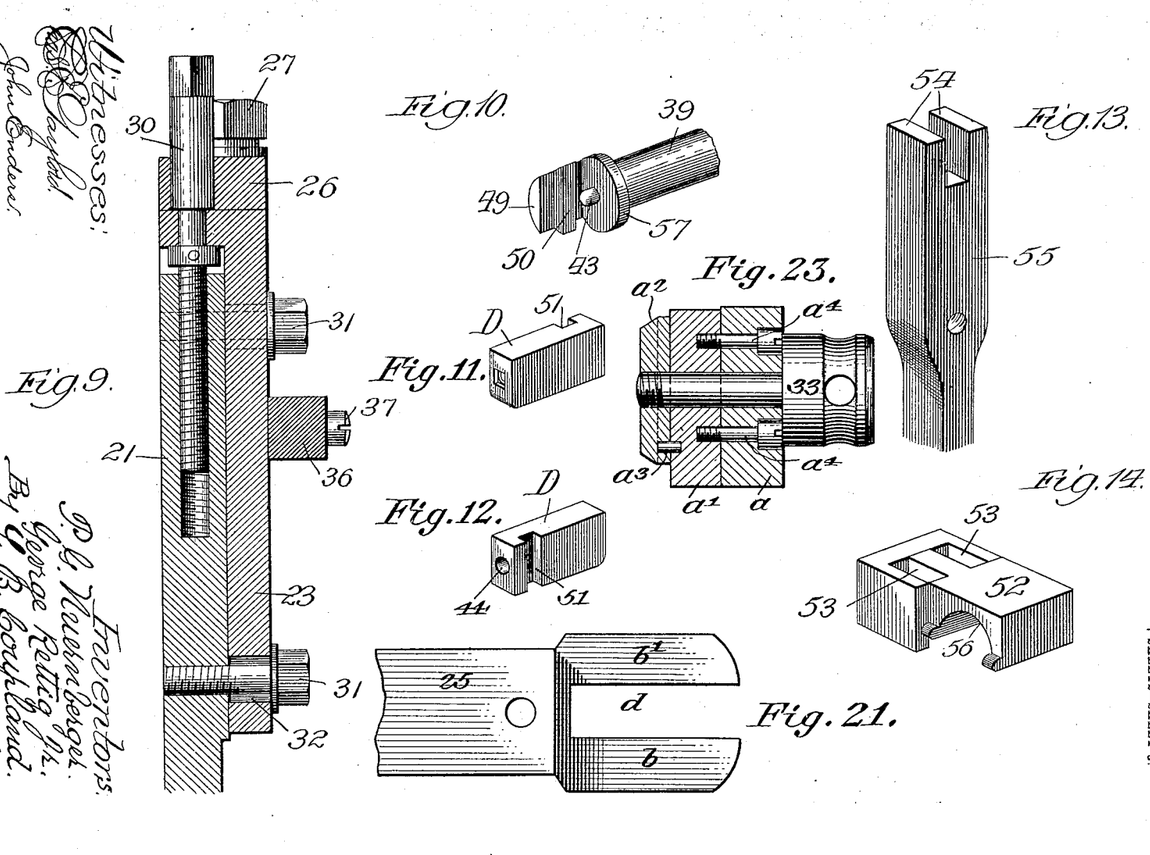

The lower mold-block 23 is adjustably mounted on the upper free end of the vibrating-plate 21. The lower mold member 24 is secured to this mold-block. The outer end of the upper mold-block 25 (Figs. 1 and 3) is movably inserted in the upper bifurcated end of a yoke 26, the lower end of which is secured to the outer end of the lower mold-block by bolts 27. The upper mold-block is retained in its working position by companion pivot-bolts 28 inserted through the yoke parts from opposite sides and which provide for the hinged opening and closing movement of the upper mold-block and the upper mold-member 29 secured thereto. The lower mold-block 23 is capable of an endwise adjustment by means of a screw-bolt 30 threaded in the plate 21, as best shown in Fig. 9. This mold-block is locked against an endwise movement by companion set screws 31 which pass through enlarged screw holes 32 in the block 23 and into the plate 21. By slacking back on the companion screws 31 the lower mold-block may be moved endwise in either direction by a proper manipulation of the adjusting screw-bolt 30. The purpose of this adjustment is to bring the ingate opening into a central position with reference to the type chamber in the mold so that the charge of molten metal is equally distributed and both sides of the type filled out alike. It will be understood that, the upper mold-block being connected with the lower block through the medium of the yoke 26, both the lower and upper blocks move simultaneously when the adjusting screw-bolt 30 is turned, so that the mold-members always retain their proper relative position. The upper mold-block 25 also has an endwise adjustment independent from that of the lower block so as to bring the upper mold-member into proper position with reference to matrices of different sizes. This adjustment is accomplished by means of a number of parts as will be next described.

Figures 5, 6, 7, 8, 22:
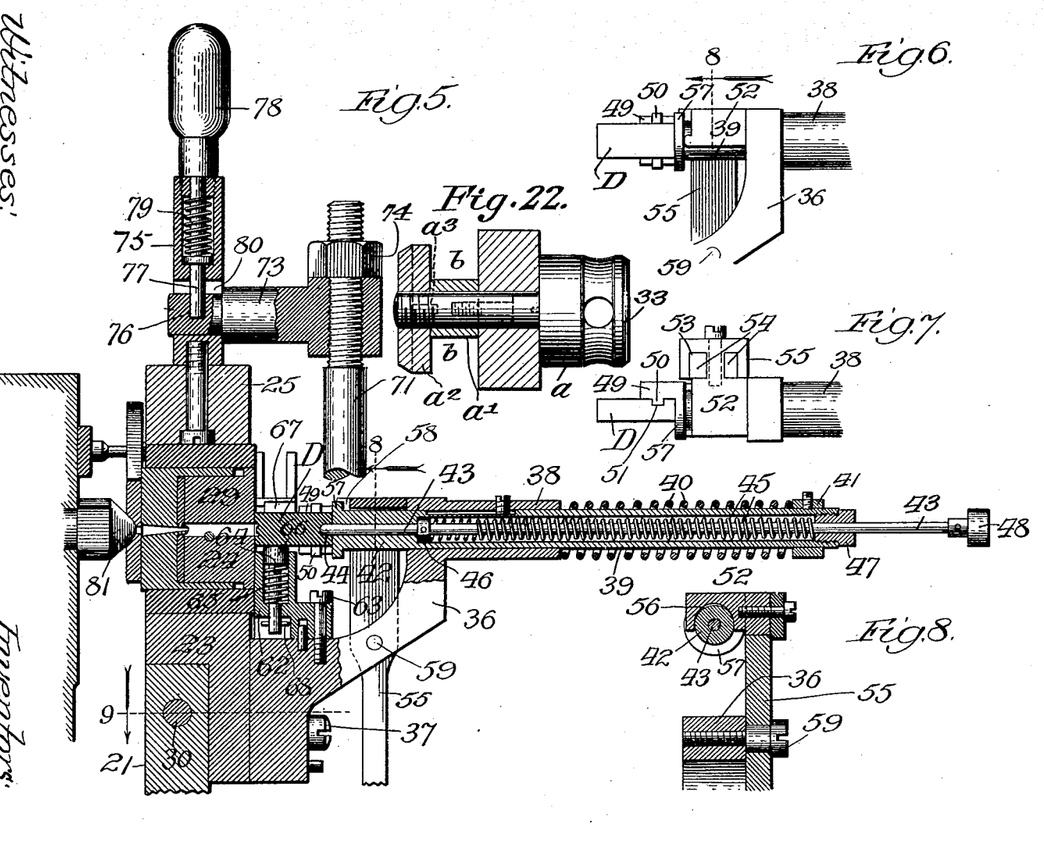
Fig. 5 is a section on line 5, Fig. 1.
Figs. 6 and 7 are details of a matrix holding feature.
Fig. 8 is a section on line 8 Figs. 6 and 5.
Fig. 22 is a vertical transverse section of parts connecting therewith.

A clamping screw-bolt 33 is inserted down through a cap-plate $a$, a guide-piece $a^1$ and threaded in a nut $a^2$, which is locked against turning by means of a dowel-pin $a^3$, extending into the guide-piece $a^1$, as best shown in Figs. 22 and 23. The guide-piece is rigidly secured to the cap-plate $a$ by screws $a^4$. A space $b$ is provided on each side of the guide-piece $a^1$ and between the cap-plate $a$ and the nut $a^2$, as shown in Fig. 22. The inner end of the upper mold-block 25 is bifurcated, the companion jaws $b'$ being adapted to enter the spaces $b$, the guide-piece $a'$ fitting the open slot $d$ in the mold-block when the parts are assembled in working relation. By loosening up on bolt 33 the mold-block, and the mold-member carried thereby, may be moved endwise for the purpose of facilitating the changing of matrices in casting type of different sizes. When the changing of the matrices is effected and the mold-block moved back to its casting position, the adjacent edge of the register plate 34 comes to a stop against the matrix and is thus locked in place without requiring a new adjustment of the mold-members for each type of a different size.

The matrix holder consists of a number of parts which are best shown in Figs. 5, 6, 7, 8, 10, 11, 12, 13 and 14. The lower end of a bracket 36 is secured to the lower mold-block 23 by a screw-bolt 37. The upper end of this bracket is provided with a stationary guide sleeve 38. A second sleeve 39 has a limited longitudinal movement in sleeve 38. A spring 40 encircles the sleeve 39 and is compressed between the inner end of sleeve 38 and a tension adjusting collar 41. The inner head end 42 of sleeve 39 provides a base against which the end of the matrix abuts when the same is inserted in its working position shown in Fig. 5. A rod 43 is inserted longitudinally through sleeve 39 and has its inner end engage a recess 44 formed in the base of the matrix. A spring 45 is coiled on the rod 44 and serves to retain the same in its engaged position in locking the matrix in place. One end of the spring 45 is compressed against a collar 46 and the other end against a follower sleeve nut 47 having a threaded engagement with the outer end of sleeve 39. The rod 43 may be retracted by the hand grasp 48 in disengaging the inner end from the matrix when the latter is to be replaced by another. The inner end of the sleeve 39 is provided at one side with a flattened extension 49 (Fig. 10) having a rib 50 formed thereon which engages with a corresponding groove 51 formed in one side of the matrix as best shown in (Figs. 11 and 12). By this means the matrix is firmly locked against accidental displacement. A loosely retained cap-piece 52 (Fig. 14) is provided in one end with slot apertures 53 for the reception of the bifurcated ends 54 (Fig. 13) of a lever 55. The other end or part of the cap 52 is curved out as at 56 to correspond to the round surface of the inner solid end of sleeve 39. This cap-piece, when in its working position is located between the inner shoulder end of the guide sleeve 38 and a flange 57 formed on the inner end of sleeve 39 and leaving a little space 58 (Fig. 5) which limits the return movement of the sleeve 39 and the matrix carried thereby when it backs away from the mold to allow the same to open and eject the type. The lever 55 is secured to the bracket 36 by a pivot pin-bolt 59. The lower free end of this lever has a stop-screw 60 inserted therethrough, the projecting end of which is adapted to have an intermittent contact with a fixed standard 61 each time that the mold moves inward to receive a charge of metal. The stop contact of screw 60 limits the forward movement of the free end of lever 55 and forces the upper end inward and imparts a corresponding movement to sleeve 39 carrying the matrix and moves the latter into its casting position against the mold. As the vibrating plate 21 moves back the pressure is relaxed and the matrix is returned to its normal position by the spring on the matrix holding sleeve. When the matrix in use is to be changed for another, the cap-piece 52 may be conveniently slipped out of place, when the sleeve 39 will be forced back to its extreme limit and allows ample room to change the matrices. The sleeve 39 is then moved inward and the cap 52 replaced to retain the matrix within the limits of its casting position. By this means the matrix is moved back from the mold each time by a straight pull so that no shoulder or other unevenness marks the line of separation on the face of the type, therefore casting a finished product.

As a further means for retaining the matrix in place a spring case 62 is provided, which is secured to the bracket 36 by a screw 63. A bolt 64 extends vertically through the center and has a spring 65 coiled thereon which is adapted to be compressed between the bolt-head 66 and the inside bottom of the case, as shown in Fig. 5. The head of the bolt 66 bears against the under side of the matrix and holds the same up against the stool 67. A pin 68 inserted through the lower end of the bolt 66 limits the upward movement thereof so that the matrix will readily pass over the beveled head of the bolt 66 in practical working.

The lower end of a curved lever-arm 69 (usually termed a "snake arm") is secured to the vibrating plate 21 by a pivot-bolt 70 so as to relatively conform to the movement thereof. The upper end of the rod E connects with the free end of the lever-arm 69; the low end being pivoted to the table B and imparts an up and down movement to the free end of the lever-arm 69 coincident with the movement of the vibrating-plate 21. The upper end of the curved lever-arm is free and has the lower end of a mold actuating arm 71 hinged thereto as at 72. The upper end of the arm 71 is threaded and extends up through one end of a link 73 and is adjustably retained therein as to the length by a nut 74 as best shown in Fig. 5. The opposite end of link 73 is attachably inserted in a lug 75 rigidly secured to the top of the upper mold-block. The inserted end of link 73 is provided in the upper side with a recess 76 with which the lower end of a locking-bolt 77 is adapted to engage (Fig. 5) in separably retaining these parts in their connected position. The upper end of locking-bolt 77 is fast in a hand grasp 78 which provides for its being retracted against the locking tension of a spring 79, when it is necessary to disconnect the mold actuating arm 71 for convenience in changing the matrices or for other purposes. The aperture 80 in the lug 75 is somewhat elongated vertically (Fig. 5.) so that the vibrating plate 21 will move part ways back from the mold and the arm 71 move upward and a little before the mold begins to open. This arrangement is for the purpose of having the mold move far enough away from the nipple-spout 81 to clear a vertically disposed mold locking-arm 82, best shown in Figs. 1 and 15. This locking-arm is provided with the bent over upper end 83 and is capable of a vertical movement. The bent over end 83 is set at an inclined angle corresponding to that of the mold members. When the mold is closed and in position up against the nipple-spout, the upper inclined end 83 of the locking-arm overhangs the upper mold-block. An adjusting bolt 84 is threaded in the inclined end 83 and at the proper time in each reciprocating movement of the mold the point of this bolt is brought in contact with the top of the upper mold-block and firmly locks the mold in its closed position during the period of time that the casting charge is being injected into the same.

The locking-arm 82 is loosely retained in place by means of guides 85 (Fig. 15) and is pivoted as at 86 to a horizontal actuating lever 87, the rear end of which is in turn pivoted as at 88, to a portion of the frame or base under the metal-pot. The front end of lever 87 carries a roller 89 which is positioned in the path of a cam 90 mounted on the driving-shaft. The high part of the cam is shown in contact with roller 89 and depresses that end of lever 87, which in turn pulls down the locking-arm 82 to its lowermost position as shown. One end of a spring 91 is secured to the machine table, the upper end being properly connected with the lever 87 as at 92. This spring serves the purpose of returning the lever and locking-arm to their upper normal position when the cam 90 has rolled on out of contact. These parts are so timed that a moment before the metal is injected into the mold the locking-arm has been pulled down and the mold locked against opening until it has cleared the arm on the back movement, when the mold opens and the type is discharged in the usual manner. This form of a locking-arm makes it necessary to adjust the same each time that the molds are changed.

Figure 3:
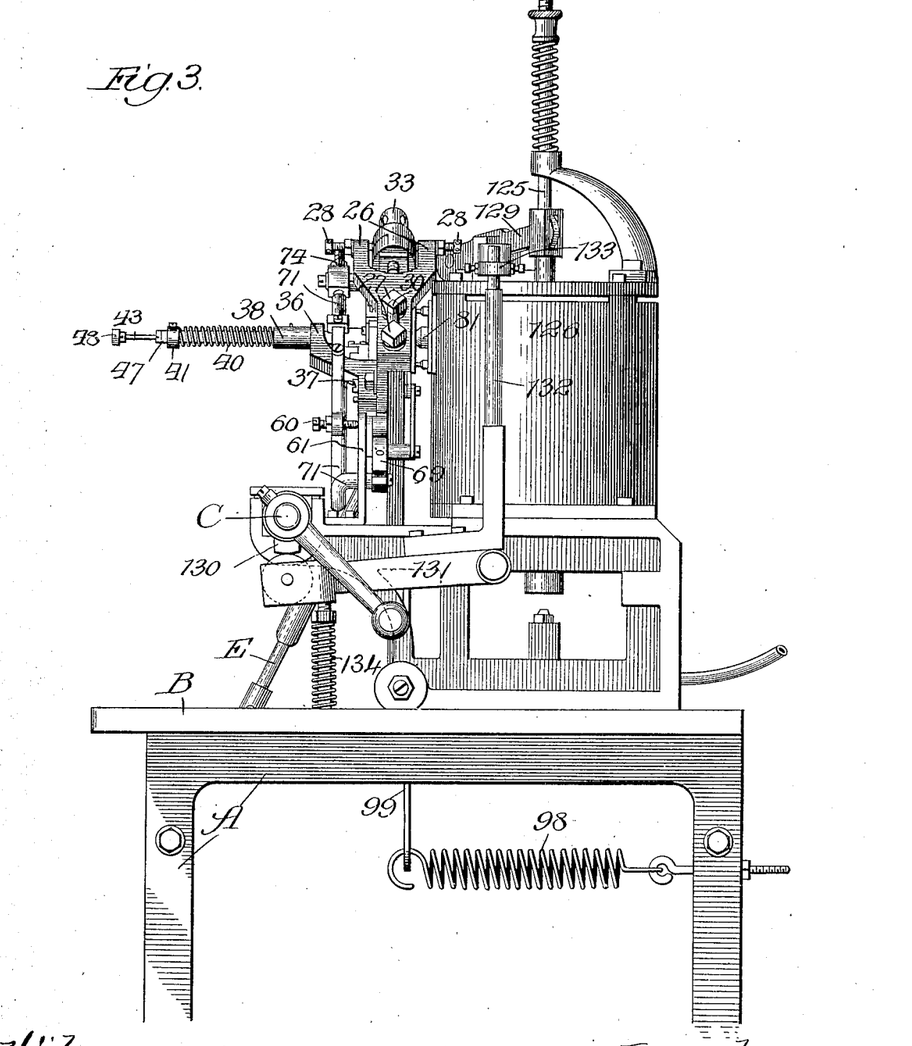
Fig. 3 is an elevation looking at the right-hand side of the machine.

One end of a frog 93 (Fig. 16) is pivoted as at 94 to the vibrating-plate 21. A roller 95 is mounted on the free end of frog 93 with which a cam 97 is mounted on the driving-shaft, has contact in each revolution and imparts the forward movement to the vibrating-plate 21, which is then returned to its back position by means of a spring 98 located below the table and connecting with the vibrating-plate by an arm 99 as shown in Fig. 3. A screw 96 is inserted through the frog 93 and bears against the vibrating-plate in adjusting the throw of the same.

Figure 1:
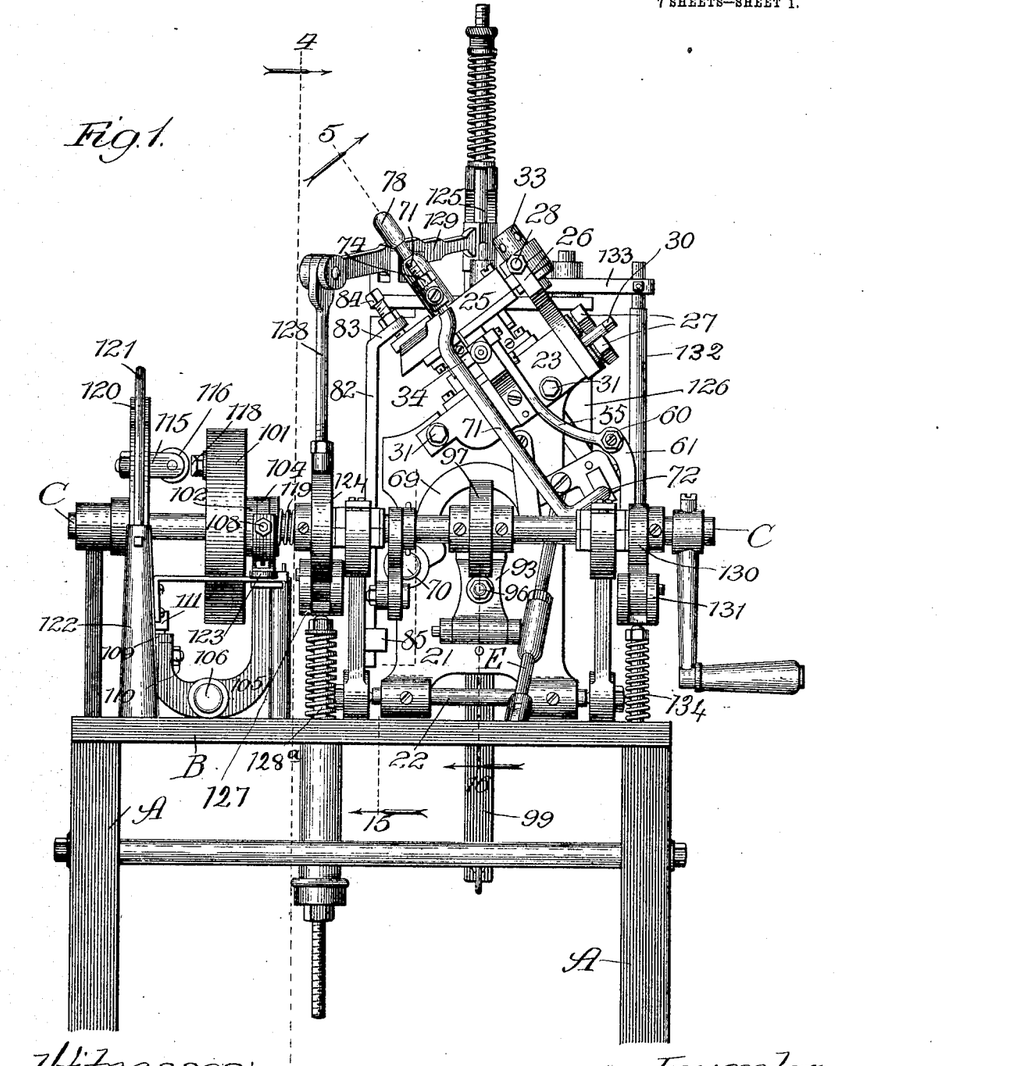
Figure 1 is a front elevation of a machine embodying the improved features.
Figure 2:
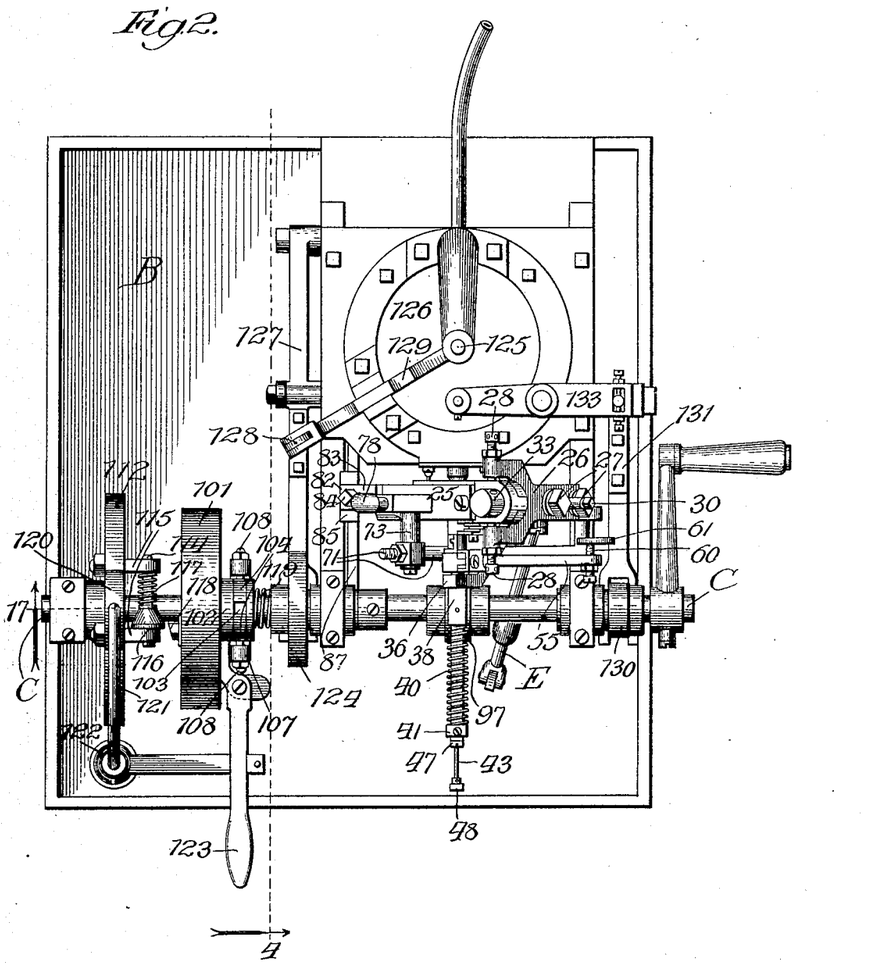
Fig. 2 is a plan.
Figures 15, 16, 17, 18, 19, 20:
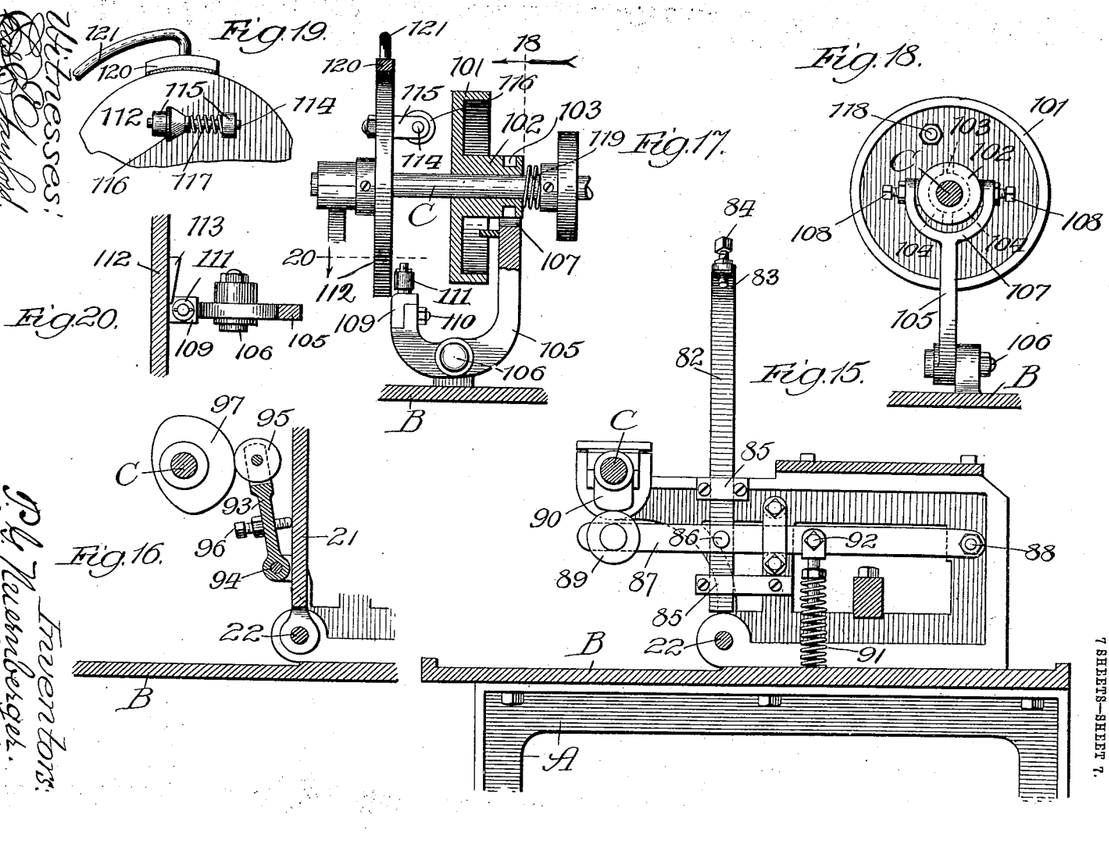
Fig. 15 is a section on line 15, Fig. 1.
Fig. 16 is a section on line 16, Fig. 1.
Fig. 17 is a section on line 17, Fig. 2.
Fig. 18 is a section on line 18, Fig. 17.
Fig. 19 is a detached detail.
Fig. 20 is a section on line 20, Fig. 17.

The parts illustrated in Figs. 17, 18, 19 and 20 provide for a continuous or intermittent stop motion of the driving-shaft. The construction and operation of these parts are of the usual character and may be described as follows. A band-pulley 101 is loosely mounted on the driving-shaft and is capable of a lateral sliding movement thereon. This pulley is provided in its extended hub end 102 with an annular groove 103 (Fig. 17) in which is loosely inserted a two part ring 104 shown in Figs. 1 and 2 and indicated by dotted lines in Fig. 18. A U-shaped lever 105 is capable of a slight rocking movement on a pivot-bolt 106. The longer part of this lever terminates in a yoke-end 107, the respective branches of which (Fig. 18) extend up on opposite sides of the pulley-hub 102 and have companion adjusting set-screws 108 inserted therethrough and which engage the two-part ring 104 on opposite sides. The shorter end of the lever 105 has an angle-plate 109 movably secured thereto by a bolt 110. A roller 111 is rotatably mounted on the angle-plate 109 and is positioned close to the inner side of the disk 112. The disk 112 is rigidly mounted on the driving-shaft C and is provided on its innerside with a shifting wedge-piece 113, which is adapted to have a predetermined contact with the roller 111 point end first, as shown in Fig. 20. A clutch-pin 114 has its respective ends loosely supported in the head ends of companion bolts 115 as shown in Figs. 1, 17 and 19. This pin is provided with a shoulder 116 which extends outside of the heads of the retaining bolts 115. A spring 117 is coiled on the clutch pin 114 and cushions the same against the intermittent contact of a clutch-pin 118 fixed in the adjacent side of the band-pulley 101. This band-pulley is held in its normal position on the driving-shaft to bring the clutch-pin into engagement with the pin 114 by a spring 119 coiled on the driving-shaft. As shown in Fig. 20, the shifting wedge 113 is just coming in contact with the roller 111, which will have the effect of rocking the U-shaped lever 105 and imparting a lateral movement to the band-pulley against the pressure of its spring 119 and separates the clutch-pins 114 and 118 from their engaged position and momentarily halts the operation of casting just as the mold opens to discharge the product. As the shifting-wedge passes on out of contact the spring 119 forces the band-pulley back to its normal position and brings the clutch-pins into position to reëngage, and so on in regular order. This arrangement is more especially used when casting the larger kinds of type so as to give a little longer time for cooling. In casting the smaller sizes of type the operation is usually continuous, which is effected by loosening up bolt 110 and turning the angle-plate 109 down out of the way so that the shifting wedge cannot contact the roller 111, when the clutch-pins will remain in continuous engagement.

The brake-shoe 120 has frictional contact with the periphery of the disk 112 and is retained in its working position by a spring-arm 121 movably inserted in a tubular standard 122. The hand-lever 123 provides a means for manually throwing the clutch mechanism out of engagement when necessary.

Figure 4:
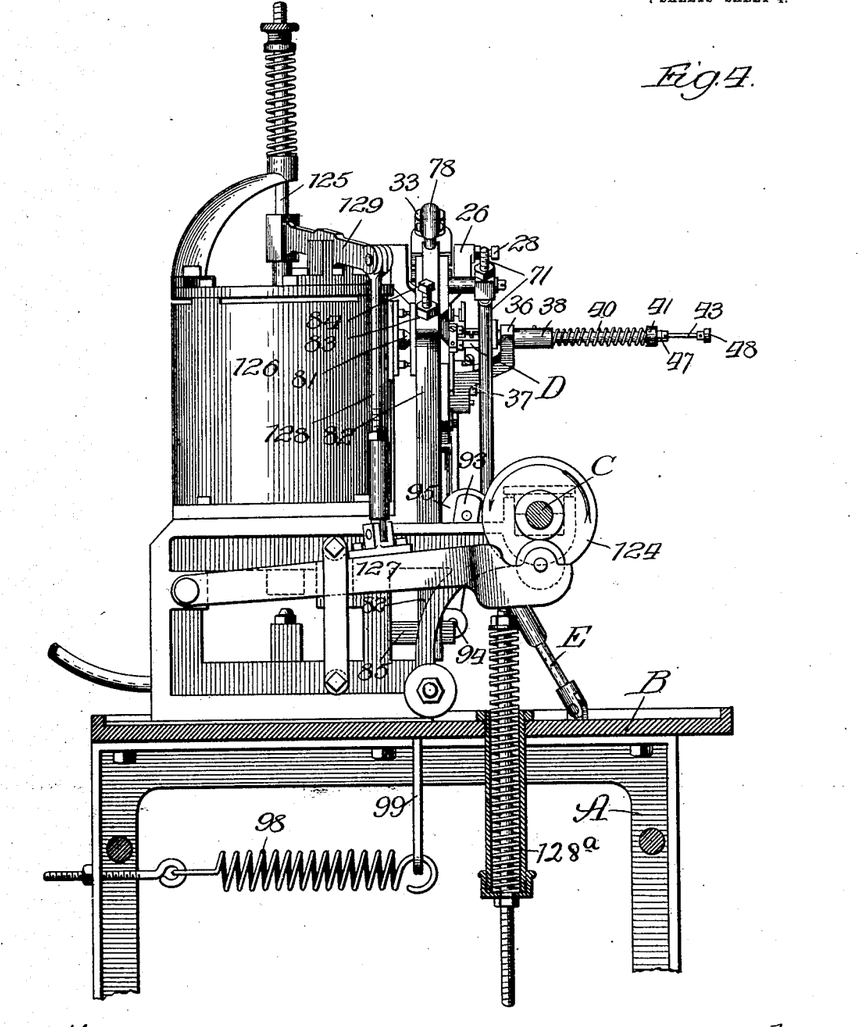
Fig. 4 is a sectional elevation on the left side of the machine, taken on line 4 of Figs. 1 and 2, looking in the direction indicated by the arrow.

A cam 124 mounted on the shaft C, actuates the pump plunger 125 located in the metal-pot 126, through the medium of a number of connecting levers 127, 128 and 129, as best shown in Fig. 4. A spring 128ª returns the outer end of lever 127 to its uppermost position when depressed by the cam 124.

The "choker" or cut-off valve (not shown) commonly used in this class of machines for controlling the flow of molten metal through the nipple-spout 81, is actuated by a cam 130, and the connecting levers 131, 132 and 133 are best shown in Figs. 1 and 3. A spring 134 holds the outer end of lever 131 in contact with its cam.

In practical working, the vibrating plate 21 has the usual rocking movement common to type casting machines. The forward movement of the vibrating plate carries the mold part up against the nipple-spout to receive the charge of metal. On the back movement the jet is broken from the type and the matrix retracted before the mold opens for the purpose of ejecting the type.

Having thus described our invention, what we claim is:—

1. In a type-casting machine, the upper mold-block, the lower mold-block, the companion mold-members carried thereby, a connecting yoke, and means for simultaneously imparting an endwise movement to said blocks and maintain the fixed relative position of the same.

2. In a type-casting machine, the upper and lower mold-blocks, the mold-members, the operative connection between said mold-blocks, a vibrating plate, an adjusting screw threaded in said plate, and means for locking the mold-blocks in the different positions to which they are capable of being adjusted.

3. In a type casting machine, a matrix-holder comprising a fixed guide sleeve, a second sleeve having a reciprocating endwise movement therein, means for holding the matrix on the inner end of said second sleeve and means for imparting said reciprocating movement.

4. In a type casting machine, a reciprocating sleeve having a rib formed on the inner flattened head end thereof, a rod extending through said sleeve and stopping short of said rib, and a matrix having a groove on one side to be engaged by said rib, and a recess in one end to be engaged by said rod, and means for retaining said rod in its engaged position.

5. In a type casting machine, a matrix holder comprising a reciprocating sleeve having a flattened inner end extension with a rib formed thereon, a fixed guide support therefor, a spring encircling said sleeve, a rod inserted longitudinally therethrough, a spring coiled thereon and holding said rod in its engaged position, and means for moving said sleeve in one direction against the action of its spring.

6. A matrix-holder for metal casting-machine, comprising a stationary guide-sleeve, a second sleeve having a reciprocating endwise movement therethrough, means for effecting such movement, a rod inserted through the movable sleeve and engaging the matrix, said rod moving with said reciprocating sleeve, and the springs for returning said sleeve and rod to their normal position.

7. In a type casting-machine, a reciprocating sleeve, means for supporting the same in its working position, a matrix having a recessed end abutting the inner end of said sleeve, a rod inserted through said sleeve and removably engaging the recess in said matrix, and means for retaining said rod in its engaged position until manually released.

8. In a type-casting machine, a reciprocating sleeve moving in a straight line both away from and towards the mold, and provided on the inner end with a flattened extension having a rib formed thereon, a matrix having a recess formed in the end thereof and a groove formed in one side to receive said rib, a rod inserted longitudinally through said sleeve and engaging the recess in said matrix, means for retaining said rod in its engaged position.

9. In a type-casting machine, an endwise movable sleeve, a cap-piece loosely engaging the same and provided with slot apertures, a lever provided with a pivotal bearing and having one end loosely engaging the slot apertures in said cap-piece, and means for controlling the action of said lever in moving said sleeve in one direction.

10. In a type casting machine, a matrix provided in one of its sides with a groove and in one end with a recess, a reciprocating sleeve having a rib formed thereon which engages said groove, and a spring pressed rod inserted through said sleeve and engaging the recessed end of said matrix.

11. In a type casting machine, a matrix having a groove formed in one side and a recess in one end thereof, a reciprocating sleeve provided with a rib engaging said groove and a rod having a spring coiled thereon and normally engaging said recessed end, and a spring actuated bolt pressing against the under side of the matrix in its working position.

12. In a type-casting machine, a reciprocating sleeve, a matrix supported on the inner end thereof, a cap-piece engaging said sleeve, a shifting lever having one end engage said cap-piece, and means for limiting the movement of the opposite end of said lever in moving said sleeve.

13. In a type-casting machine, a reciprocating sleeve, a lever having a rocking movement, a detachable cap connecting said sleeve and lever, an adjustable stop-screw inserted in the lower free end of said lever, and a fixed standard arresting the inward movement of said screw.

14. In a type casting machine, a mold actuating arm, a link mounted on the upper end thereof, the upper mold-block, a lug fixed thereon and provided with an elongated aperture for the loose engagement of the free end of said link, means for detachably retaining said lug and link in their engaged relation, and a locking-arm overhanging the upper mold-block and locking the same against opening until said mold-block has moved back far enough to clear said locking-arm and before said actuating arm has moved far enough to open the upper mold member.

15. In a type casting machine, the opening mold-member, a mold locking-arm having its free end overhanging said member and locking the same in its closed position during the time that the metal charge is being injected therein, and means for periodically moving said arm into and away from its locking position.

16. In a type-casting machine, the upper mold-block, the mold-member carried thereby, a locking-arm capable of a vertical movement and overhanging said mold-block, an actuating lever having a pivotal connection with said arm and adapted to move the same into its locking position, and a spring for returning said arm and lever to their normal position.

In testimony whereof we affix our signatures, in presence of two subscribing witnesses.

PHILIP G. NUERNBERGER.
GEORGE RETTIG, Jr.

Witnesses:
L. B. COUPLAND,
G. E. CHURCH.